(12) United States Patent
Below

(10) Patent No.: US 7,446,636 B1
(45) Date of Patent: Nov. 4, 2008

(54) SYSTEM UTILIZING THE EARTH'S MAGNETIC FIELD TO GENERATE A FORCE IN OPPOSITION TO THE FORCE OF GRAVITY

(76) Inventor: John Below, 4900 Industrial Way, Benicia, CA (US) 94510

( * ) Notice: Subject to any disclaimer, the term of this patent is extended or adjusted under 35 U.S.C. 154(b) by 682 days.

(21) Appl. No.: 10/985,549

(22) Filed: Nov. 10, 2004

(51) Int. Cl.
*H01F 6/00* (2006.01)
(52) U.S. Cl. ........................... 335/216; 244/1 R
(58) Field of Classification Search ............... 335/216; 336/DIG. 1; 244/1 R
See application file for complete search history.

(56) References Cited

U.S. PATENT DOCUMENTS 4,916,404 A * 4/1990 Tsumaki et al. ............. 315/501

* cited by examiner

*Primary Examiner*—Ramon M Barrera
(74) *Attorney, Agent, or Firm*—Thomas R. Lampe

(57) ABSTRACT

A loop of superconducting material forms a continuous current flow path. A portion of the loop is shielded from the Earth's magnetic field and another portion is unshielded. Charged particles flowing through the unshielded portion cooperate with the Earth's magnetic field to create an upward force on said loop.

19 Claims, 3 Drawing Sheets

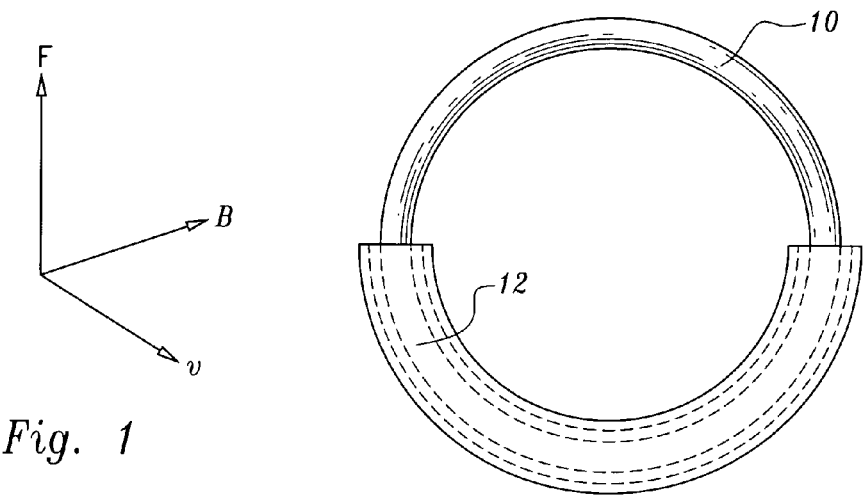
Fig. 1
Fig. 2
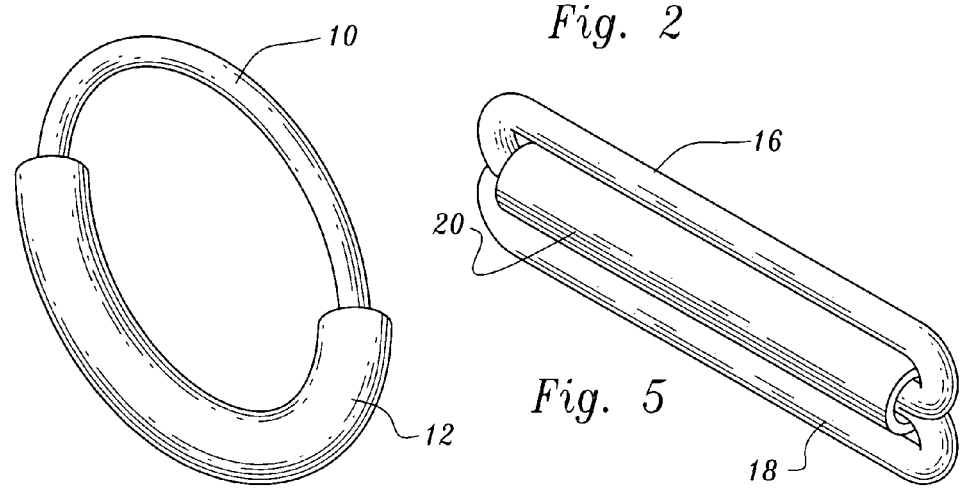
Fig. 3
Fig. 5
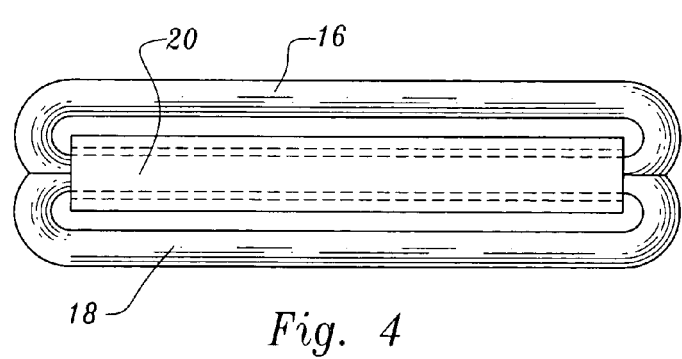
Fig. 4

SYSTEM UTILIZING THE EARTH'S MAGNETIC FIELD TO GENERATE A FORCE IN OPPOSITION TO THE FORCE OF GRAVITY

TECHNICAL FIELD

This invention relates to apparatus utilizing the Earth's magnetic field to apply a force to the apparatus in opposition to the force of gravity. The invention also encompasses a method.

BACKGROUND OF THE INVENTION

Geo-Levitronics

There is a common perception that vehicles of the future will be capable of hovering and flying. This ability to levitate would provide significant benefits to military, commercial, and personal transportation. If man can make an object levitate it will likely be by applying currently known science. It is unlikely that gravitation, itself, will be controllable since there are no current practical examples of antigravity or even gravitational manipulation. Some other mechanism will have to be employed to oppose the gravitational force that holds matter to the Earth. The term "Geo-levitronics" is employed herein for the study of such a mechanism and the names "Geo-levitron" or "Geolev" are used to describe a device that could be made to levitate within the Earth's gravitational field.

Traditionally transport through the atmosphere relied on manipulating the atmosphere itself. Crafts such as hot air balloons and zeppelins use the buoyant effects of the atmosphere to lift and support themselves. They use a fabric enclosed volume filled with a gas lighter than the atmosphere. The drawback is that these vehicles are large and bulky and cannot move with any effective speed. Airplanes rely on their rapid forward motion to create lift as they "plane" through the air. They must be in motion to create this lifting effect. Hovering craft such as helicopters force air downwards to create lift. These can be effective, maneuverable craft, but they consume a great amount of energy to maintain flight and are highly complex machines.

Other craft such as rockets do not use the atmosphere to lift themselves. They create their own thrust by burning fuels and directing the discharging gas downwards against the pull of gravity. They are somewhat limited to vertical motion and are less practical as a means of transport within the Earth's gravitational field.

Magnetic levitation has been used to raise vehicles such as trains or monorails. This has been shown to be effective but travel is limited to magnetic rail beds that must be constructed and supported on the ground.

Geomagnetic Levitronics

Since gravity is what binds objects to the surface of the Earth a force must be found to oppose it. Magnetic forces exist and can be manipulated relatively easily. While magnetism does not directly act with or against gravity it can be made to interact with the Earth's magnetic field to produce buoyancy or a levitation effect, to oppose the force of gravity. This application of science is termed geomagnetic levitronics herein and the purpose of this discussion is to outline its practical application to making matter float within the Earth's magnetic field.

Charges in Motion

It is a well-studied phenomenon that a charged particle moving through a magnetic field is deflected by that field. In 1897 J. J. Thompson, working at Cambridge University, discovered this effect by studying charges moving in a vacuum. This led to the discovery of the electron and the development of the cathode ray tube. This principle is employed in every television picture tube and computer CRT.

In 1879 Edwin Hall, at Johns Hopkins University, found that the same principle applies to current moving through a conductor. The relationship is the vector product:

$$F = qv \times B$$

Or in scalar notation:

$$F = qvB \sin \theta$$

Where:

F=force acting on the charged particle, or Lorentz Force (Newton)

q=the amount of charge on the particle (Coulomb)

v=the velocity of the particle (meter/second)

B=the magnitude of the magnetic field (Tesla)

$\theta$=the smaller angle between vectors v and B (degree)

In the case of current moving inside a conductor located at a right angle to a magnetic field:

$\theta = 90°$, $\sin \theta = 1$ q=–e (the charge on an electron, or $-1.60 \times 10^{-19}$ C)

v=$v_d$ (the drift velocity of electrons, or ~$10^6$ m/s)

the force acting upon each electron becomes:

$$F_e = -ev_d B$$

The total force on N electrons is:

$$F = \Sigma F_e = -Nev_d B$$

Referring to FIG. 1 of the drawings hereof, in a segment of a conductor with length L, cross sectional area A, and a charge density of n this may be written as:

$$F = -nALev_d B$$

Relating this to the definition of current, i, where i=–nAev$_d$:

$$F = i\,LB$$

Solving for the current, i:

$$i = F/LB$$

The Earth's Magnetic Field

Through a plane which contains the Earth's equator a uniform magnetic field exists and is directed from geographic south to north. When viewed from above (northern perspective) the lines of the magnetic field are directed upwards at the observer. A positively charged particle moving from west to east is acted on by a force in a direction away from the Earth.

Solving for the amount of current to produce 1 Newton of lift force per unit length (1 meter) of conductor near the Earth's surface where the strength of the magnetic field is approximately $10^{-4}$ Telsa (by definition 1 Tesla=1 Newton/ Ampere meter):

$$i = 1N/(1m)(10^{-4} N/Am) = 10^4 A$$

10,000 amps are required to obtain one Newton (0.2248 lbf) of levitation force per meter of conductor length. Therefore it takes a very high amount of current to yield any meaningful lift force. This kind of current density, however, is not out of the realm of possibility for a superconductor. Superconductors are materials that conduct with no resistance. The conducting electrons in a superconductor are truly free to move through the material with no thermal energy loss. Currents created in superconducting loops have continued for years without losing strength.

DISCLOSURE OF INVENTION

The present invention relates to apparatus utilizing the Earth's magnetic field to apply a force to the apparatus (and any object attached thereto) in opposition to the force of gravity. The invention additionally incorporates a method of utilizing the Earth's magnetic field to apply a force to an object opposed to the force of gravity.

In both the apparatus and method the generation of a force in opposition to the force of gravity, a lifting force, is accomplished by utilizing a loop of superconducting material cooperable with the Earth's magnetic field. Under the right conditions, a current could be induced in a ring or loop of superconducting material and the material would "float" or levitate indefinitely, assuming of course that technology has advanced to such a state. In any event, the present invention utilizes the present state of technology, including the technology of superconductors, to apply an upward force on an object with the effect of reducing the apparent weight of the object. Someday it is anticipated that developing technologies will reach a state enabling lifting or levitation of an object. In any event, the present invention as disclosed and claimed herein has utility in that the apparent "load weight" of an object is reduced to at least some degree by utilizing the principles of the invention.

The apparatus of the present invention utilizes the Earth's magnetic field to apply an upwardly directed force to the apparatus in opposition to the force of gravity.

The apparatus includes at least one loop of superconducting material forming a continuous current flow path having charged particles flowing therealong and a magnetic shield.

A first portion of the at least one loop is shielded from the Earth's magnetic field by the magnetic shield and a second portion of the at least one loop is unshielded from the Earth's magnetic field by the magnetic shield.

The flowing charged particles in the second portion are cooperable with the magnetic field to create the upwardly directed force.

The method of the invention includes the step of incorporating in an object at least one loop of superconducting material forming a continuous flow path. Next are the steps of causing and maintaining a current flow of charged particles in the continuous flow path.

A magnetic shield is positioned over a first portion of the at least one loop of superconducting material.

A second portion of the at least one loop of superconducting material is left unshielded from the Earth's magnetic field.

Next comes the step of orienting the at least one loop of superconducting material so that the current flow of charged particles in the second portion is generally west to east and cooperates with the Earth's magnetic field to create the upwardly directed force.

Other features, advantages and objects of the present invention will become apparent with reference to the following description and accompanying drawings.

BRIEF DESCRIPTION OF DRAWINGS

FIG. 1 is a diagram illustrating force acting on a charged particle as a function of the magnitude of a magnetic field and velocity of the particle;

FIG. 2 is a top, plan view of a first embodiment of apparatus constructed in accordance with the teachings of the present invention;

FIG. 3 is a perspective view of the embodiment of FIG. 2;

FIG. 4 is a view similar to FIG. 2, but illustrating a second embodiment of the invention;

FIG. 5 is a perspective view of the second embodiment;

MODES FOR CARRYING OUT THE INVENTION

Figure 6:
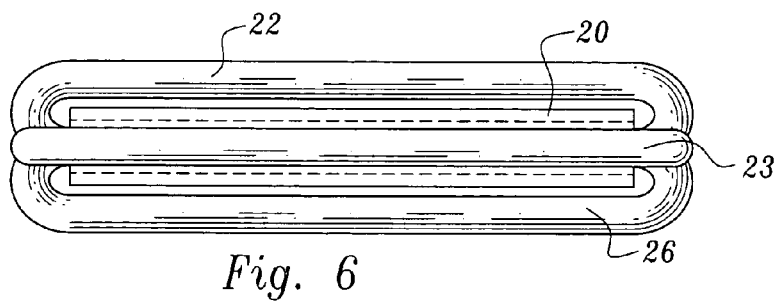
FIG. 6 is a side, elevational view of a third embodiment of the invention.

Under the right conditions a current could be induced in a ring or loop of superconducting material and that material would "float" or levitate indefinitely.

Some of the considerations for this to happen are:

1. Current traveling west to east would produce an upward force or lift and current traveling east to west would produce a downward force. To produce a net lifting force the portion of the superconducting loop where the current moves east to west would have to be shielded from the Earth's magnetic field.

A magnetic shielding material, such as Mu-metal could be used for this. Mu-metal is a nickel iron alloy (77% Ni, 15% Fe, plus Cu and Mo) that has the property of shielding external magnetic fields up to 0.1 Tesla, thus making it a very effective shield of the Earth's magnetic field of 0.0001 Tesla.

2. The current loop and shielding would have to be maintained in an orientation of west to east to obtain maximum lift. Lift could be controlled by either changing the effective west-east alignment or by adjusting the amount or effectiveness of the magnetic shielding. Two issues relating to stability arise. The first is keeping the levitron level. This is fairly easy to accomplish and can be done by locating the center of gravity of the device below the effective center of action of the buoyancy force (very similar to designating a stable boat or floating platform. Note: that like an enclosed object floating on water the levitron can be flipped upside down around the axis of current flow (the west to east axis) without losing buoyancy. This is because the direction of the flow of current has not changed).

The other point of stability is much more difficult to ensure, i.e. the need to maintain a west to east orientation. Two bar magnets can demonstrate this problem very well. With one magnet laid upon a table the other magnet can be positioned above it with like poles oriented one over the other resulting in repelling forces making the top magnet float or levitate. If you release the top magnet it will not maintain its alignment, but will quickly flip end for end and slam down upon the lower magnet as the opposite poles attract each other. The same effect applies to the geo-levitron. The need to hold the west to east orientation is critical and is perhaps the greatest problem in achieving a successful design. Gyroscopic motion would be one way of obtaining a stable orientation. Since the geo-lev can be flipped about its axis of current flow without changing its buoyancy it could be made to spin about that axis creating gyroscopic stability.

3. The shape, direction, and intensity of the Earth's magnetic field will have to be considered, especially if the device is to be moved for any appreciable distance. The Earth's magnetic field is not uniform and is subject to severe distortion by the presence of magnetic lodestone at or near the surface and by cosmic particles passing Earth from the solar wind. Geomagnetism may well become a significant branch of science when the geomagnetic levitron becomes practical.

4. Travel at or near the equator will be much more effective because the lines of magnetic force are most nearly parallel to the Earth's surface. The closer you are to the magnetic poles the more vertical the lines of magnetic force are and the lift produced by the geo-levitron will not be purely vertical, but will tend toward the nearest pole (the polar force). This effect becomes such that at the pole itself where the magnetic lines are vertical there is no net lifting force. This effect can be used to advantage at lower latitudes by what can be called the rebound effect. To move from say San Francisco to Paris in a projected straight line would mean fighting the polar force the entire distance. If, however the traveler propelled himself toward the equator at just the right angle he would reach a point halfway to his destination where his momentum combined with the polar force would then carry him to his destination.

5. Travel in the upper atmosphere would be complicated by the effects of the solar wind, charged particles that interact with and distorts the Earth's magnetic field. Another complication is due to the fact that the Earth's geographic axis is not the same as its geomagnetic axis resulting in a continual shift in the magnetic field lines throughout the course of the solar day. This effect will be more pronounced as you approach the Earth's poles and is another factor that favors travel near the equator.

Some additional interesting facts about the Earth's magnetic field:

Not all planets have a magnetic field. Mercury is thought to have none. The Earth enjoys a rather strong magnetic field by comparison to most of the planets in our solar system.

It is known from geologic studies that the Earth's magnetic field changes over time and that the magnetic polarity has flipped at least five times since the Earth first formed. Paleomagnetism is the study of the Earth's magnetic field through geological time.

Referring now to FIGS. 2 and 3, the simplest form of apparatus constructed in accordance with the teachings of the present invention is a circular loop 10 of superconducting material wherein a portion (half) of the loop is covered and surrounded by a tubular magnetic shield 12. When current is induced in the loop, charged particles flow along the path of the loop. In the case of clockwise current flow, positive charges in the top unshielded portion (half) of the loop move from left to right and the negative charges, or electrons, move from right to left. The magnetic shield effectively covers the charges moving from right to left. Thus when the device is oriented properly in the Earth's magnetic field (negative charges flowing west to east) the result is a lifting or buoyant force. The orientation of the lifting portion or segment above the shielded portion or segment is desirable with the lifting force acting at a point above the center of gravity of the loop, producing stability.

The loop need not be circular in shape, but can be an oval or any other convenient geometry where one half can be shielded.

FIGS. 4 and 5 show a more efficient embodiment including two current loops 16, 18 joined together and having elongated segments. The joined region of this embodiment is covered by a tubular magnetic shield 20. That is, a single shielded portion is shared by the two elongated loops. Thus current flowing in the two unshielded conductors disposed along a common plane flows in the same direction and produces twice the lifting force for approximately the same amount of shielding as a single current loop. This principle applies to any higher number of current loops arranged with a common shielded return portion.

Figure 7:
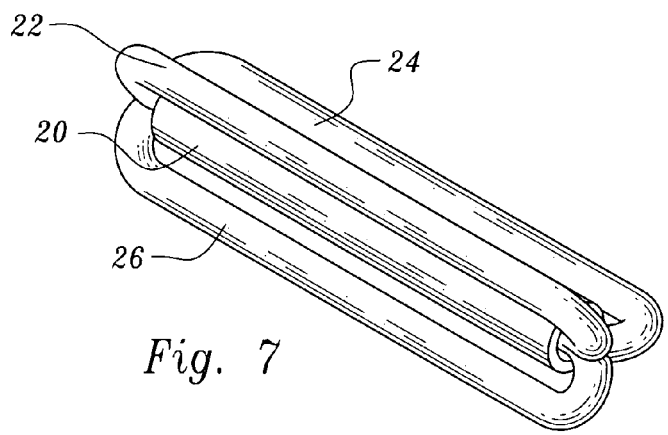
FIG. 7 is a perspective view of the third embodiment.

FIGS. 6 and 7 show an embodiment with three current loops 22, 24, and 26. The number and arrangement of loops is dictated by the overall design of the levitron craft and the need for stability and control.

Figure 8:
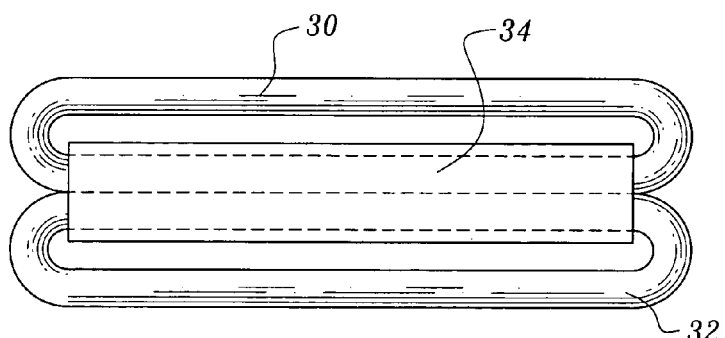
FIG. 8 is a side, elevational view of a fourth embodiment of the invention.
Figure 9:
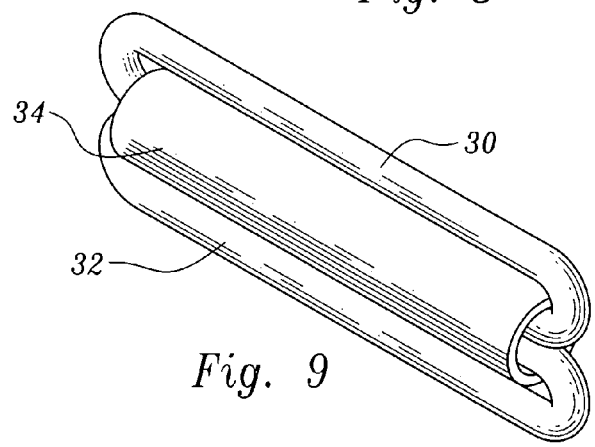
FIG. 9 is a perspective view of the fourth embodiment.

FIGS. 8 and 9 show an embodiment similar to that shown in FIGS. 4 and 5 in that two current loops 30, 32 share a single section of tubular shielding 34. The co-planar current loops are, however independent and can provide more reliability. If one current loop is damaged then lifting force is only lost in that loop due to the fact that each loop has its own separate shielded portion.

Figure 10:
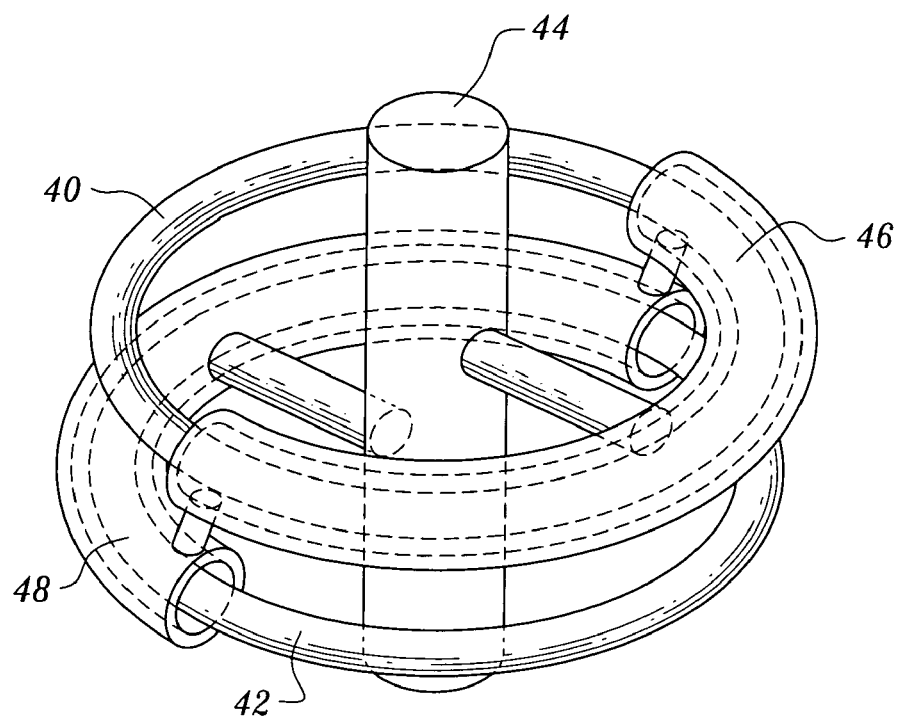
FIGS. 10 and 11 are perspective views of a fifth embodiment of the invention, FIG. 10 incorporating hidden lines to show internal details thereof.
Figure 11:
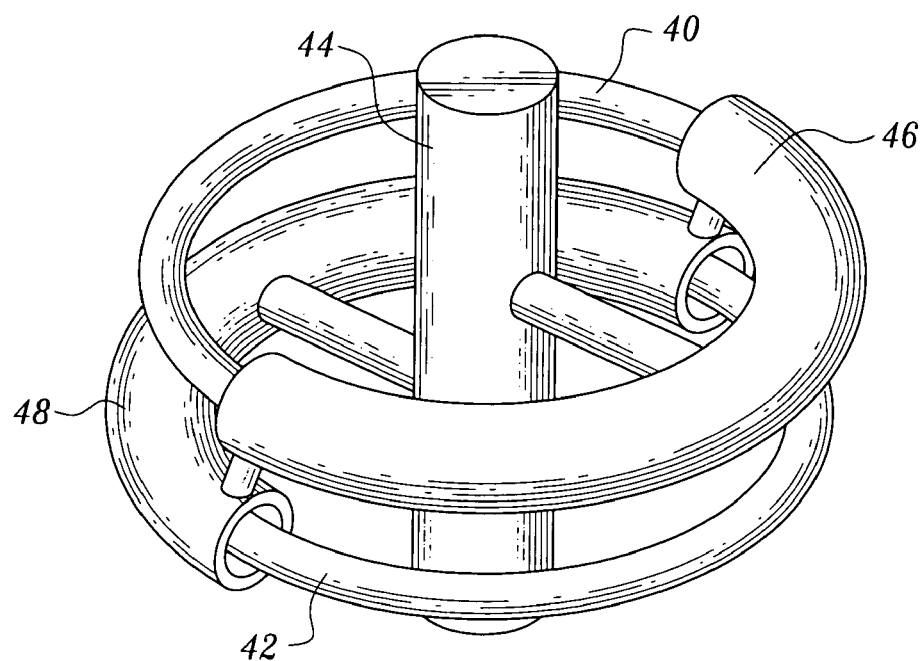

The embodiment of FIGS. 10 and 11 has the current in two superposed loops 40, 42 moving in opposite directions. The loops are attached by structure 44. With opposing sides of each loop shielded as shown in these figures a stable lift force is achieved as the electron flow in the unshielded portions is aligned from west to east. Tubular magnetic shields 46, 48 are offset from one another. That is, the shielded portion of loop 40 is over the unshielded portion of loop 42 and the unshielded portion of loop 40 is over the shielded portion of loop 42.

The invention claimed is:

1. Apparatus utilizing the Earth's magnetic field to apply an upwardly directed force to the apparatus in opposition to the force of gravity, said apparatus including at least one loop of superconducting material forming a continuous current flow path having charged particles flowing therealong and a magnetic shield, a first portion of said at least one loop of superconducting material being shielded from the Earth's magnetic field by said magnetic shield and a second portion of said at least one loop of superconducting material being unshielded from the Earth's magnetic field, said flowing charged particles in said second portion cooperable with said magnetic field to create said upwardly directed force, said apparatus oriented so that the current in said first portion flows generally east to west and the current in said second portion generally flows west to east.

2. The apparatus according to claim 1 including a plurality of said loops of superconducting material, said magnetic shield shielding first portions of each of said loops of superconducting material, the second portions of each of said loops being unshielded.

3. The apparatus according to claim 2 wherein the current flowing in the second portions of said plurality of loops of superconducting material flows in substantially the same direction.

4. The apparatus according to claim 1 wherein said magnetic shield is tubular and completely surrounds said first portion.

5. The apparatus according to claim 3 wherein said magnetic shield comprises a tube completely surrounding the first portions of at least two of said plurality of loops of superconducting material.

6. The apparatus according to claim 1 including a plurality of said loops of superconducting material, the loops of said plurality of loops of superconducting material attached to one another at the first portions thereof, said magnetic shield surrounding said first portions.

7. The apparatus according to claim 6 wherein said second portions of said plurality of loops of superconducting material are disposed externally of said magnetic shield, elongated and substantially parallel to one another.

8. The apparatus according to claim 7 wherein said second portions are spaced from one another.

9. The apparatus according to claim 7 wherein the second portions of at least two of said loops of superconducting material are disposed in a common plane.

10. The apparatus according to claim 1 including a plurality of said loops of superconducting material, at least two of said loops of superconducting material having a common first portion.

11. The apparatus according to claim 1 including a pair of said loops of superconducting material comprising superposed upper and lower loops of superconducting material, and the magnetically shielded first portion of the upper loop of superconducting material positioned over the unshielded second portion of the lower loop of superconducting material, and the unshielded second portion of the upper loop of superconducting material positioned over the magnetically shielded first portion of the lower loop of superconducting material.

12. The apparatus according to claim 11 additionally comprising connector structure rigidly interconnecting the upper and lower loops of superconducting material.

13. The apparatus according to claim 1 wherein said at least one loop of superconducting material has a circular configuration.

14. A method of utilizing the Earth's magnetic field to apply an upwardly directed force to an object opposed to the force of gravity, said method comprising the steps of:
    incorporating in said object at least one loop of superconducting material forming a continuous flow path;
    causing and maintaining a current flow of charged particles in said continuous flow path;
    positioning a magnetic shield over a first portion of said at least one loop of superconducting material;
    leaving a second portion of said at least one loop of superconducting material unshielded from the Earth's magnetic field; and
    orienting the at least one loop of superconducting material along an axis so that the current flow of charged particles in said second portion is generally west to east and cooperates with the Earth's magnetic field to create said upwardly directed force.

15. The method according to claim 14 including the step of adjusting the lifting force by changing the orientation of said loop of superconducting material.

16. The method according to claim 14 wherein said step of positioning said magnetic shield comprises surrounding said first portion with a tubular-shaped magnetic shield.

17. The method according to claim 14 whereby the positioning and extend of magnetic shielding is varied to change the amount of lifting force.

18. The method according to claim 14 including the step of rotating the loop about said axis to produce gyroscopic stability.

19. Apparatus utilizing the Earth's magnetic field to apply an upwardly directed force to the apparatus in opposition to the force of gravity, said apparatus including at least one loop of superconducting material forming a continuous current flow path having charged particles flowing therealong and a magnetic shield, a first portion of said at least one loop of superconducting material being shielded from the Earth's magnetic field by said magnetic shield and a second portion of said at least one loop of superconducting material being unshielded from the Earth's magnetic field, said flowing charged particles in said second portion cooperable with said magnetic field to create said upwardly directed force, said first and second portions being relatively positioned to direct the upwardly directed force along the center of gravity of the apparatus.

* * * * *